United States Patent [19]

Dunnigan et al.

[11] Patent Number: 4,875,910
[45] Date of Patent: Oct. 24, 1989

[54] FILTER FOR REMOVING CANCER CAUSING COMPOUNDS FROM EXHAUST FUMES

[75] Inventors: Jacques Dunnigan; Hugues Menard, both of Sherbrooke, Canada

[73] Assignee: L'Institut De L'Amiante, Montreal, Canada

[21] Appl. No.: 749,565

[22] Filed: Jun. 27, 1985

[51] Int. Cl.$^4$ ............................................. B01D 53/04
[52] U.S. Cl. ........................................ 55/74; 55/387; 502/410; 502/518
[58] Field of Search ................... 55/74, 387; 502/60, 502/72, 80, 40, 518

[56] References Cited

U.S. PATENT DOCUMENTS

| | | | |
|---|---|---|---|
| RE. 31,719 | 10/1984 | Sonetaka | 502/63 |
| 472,540 | 4/1892 | Jenkins | 502/410 X |
| 1,623,169 | 4/1927 | Dalen | 502/410 |
| 1,985,840 | 12/1934 | Sadtler | 502/80 X |
| 2,108,860 | 2/1938 | Kauffman | 502/80 X |
| 2,323,874 | 7/1943 | McMullen et al. | 502/80 X |
| 2,324,079 | 7/1943 | Greger | 55/387 X |
| 2,391,312 | 12/1945 | Ewing et al. | 502/80 |
| 2,439,538 | 4/1948 | Burgess | 502/410 |
| 2,475,328 | 7/1949 | La Lande, Jr. | 502/410 X |
| 3,001,853 | 9/1961 | Hemstock | 502/410 |
| 3,049,449 | 8/1962 | Allegrini | 502/80 |
| 3,065,595 | 11/1962 | Gary | 60/30 |
| 3,271,323 | 9/1966 | Whittemore, Jr. | 502/80 X |
| 3,428,568 | 2/1969 | Harker et al. | 502/410 X |
| 3,658,459 | 4/1972 | Gartlan | 502/80 X |
| 3,899,300 | 8/1975 | D'Olier | 60/302 X |
| 4,213,882 | 7/1980 | Kranich | 502/63 |
| 4,353,872 | 10/1982 | Midorikawa | 422/179 |
| 4,364,857 | 12/1982 | Santilli | 502/72 |

FOREIGN PATENT DOCUMENTS

| | | | |
|---|---|---|---|
| 23077 | 2/1980 | Japan | 502/80 |
| 1502372 | 3/1978 | United Kingdom . | |
| 2108948 | 5/1983 | United Kingdom | 502/80 |

Primary Examiner—Robert Spitzer
Attorney, Agent, or Firm—Cushman, Darby & Cushman

[57] ABSTRACT

Industrial exhaust polyaromatic hydrocarbons are readily absorbed by flowing through a bed of dry porous pellets consisting of a mixture of natural magnesium silicate selected from short chrysotile asbestos fibers, attapulgite and mixtures thereof with a cementitious clay binder, the latter representing from 1 to 20% by weight of the dry pellets, whereby substantially all the particulate and gaseous pollutants present in the exhaust material are adsorbed by the dry porous pellets.

2 Claims, No Drawings

FILTER FOR REMOVING CANCER CAUSING COMPOUNDS FROM EXHAUST FUMES

PRIOR ART

The carcinogenic potential of polyaromatic hydrocarbons (PAH) is well known. PAHs are a group of chemicals where constituent atoms of carbon, oxygen and hydrogen are linked by chemical bonds in such a way as to form two or more rings, or "cyclic" arrangements. For this reason, these are sometimes called polycyclic hydrocarbons. Examples of such chemical arrangements are anthracene (3 rings), pyrene (4 rings), benzo-pyrene (5 rings), and similar polycyclic compounds.

Such compounds have been identified in situations where combustion of complex organic materials is taking place, and where pyrolysis is incomplete. Several industrial sources of these compounds are known: incomplete pyrolysis of coke in metallurgy, in aluminium pot rooms, of fuel oil in heat generating equipments, to name but a few. It is also known that internal combustion engines (diesel or gasoline engines) are an important source of these pollutants. Incomplete combustion of natural gas has also been found to be a source of 3,4-benzpyrene emissions. PAHs have also been identified in tobacco smoke.

Several of these PAHs are known to be carcinogens, operating by genotoxic mechanisms, and their presence in tobacco smoke has been linked with the synergism observed in smokers exposed to high levels of respirable dusts in uncontrolled workplace situations.

Contamination of ambient air with PAHs from many different industrial sources may be especially crucial in situations where these sources are confined in closed work sites, such as may be found in underground mines, warehouses, large garages servicing fleets of vehicles, emergency power stations, and the like where diesel and/or gasoline equipments such as air compressors, electrical generators and loaders, are extensively used. This fact underlines the importance of scrubbing exhaust fumes produced by such equipments.

Various types of scrubbing systems for soot particles and harmful pollutant chemicals have been designed. In addition to the well-known water scrubbing technology, they include the use of standard and catalyst ceramic traps, and metal mesh trap. The use of organometallic fuel additives is also claimed to provide metal dispersion in the particulate matter collected in the ceramic traps, in order to reduce the ignition temperature for the combustion o the particulates. The price for precious metal-catalyst ceramic scrubbing material is currently around 20 U.S.$/lb.

The use of water/diesel emulsion for operation of diesel engine has also been studied for reduction of $NO_x$ emissions, with efficiency ranging from 24 to 46%, and from 22 to 54% for insoluble particulates, but with a concomittant CO and THC emissions. A draw-back of the use of water-diesel emulsions is the significant corosion and wear after only 45 hrs of operation of the engine.

Improvements in or relating to exhaust gas reactor catalytic masses have been claimed, where there is provided a reactor core, including a body of catalytically active material providing through flow of exhaust gases, and being at least partially covered by an impervious supporting and insulating element comprising a mineral fiber bound with an inorganic silicate, said element being semi-rigid at normal operating temperature of the core (U.K. Patent Specification No. 1,461,784).

In such a system, the use of mineral fibers (glass fiber, slag fiber, rock wool, metal silicate fiber, asbestos fiber) is to provide support for the active catalytic core, which would otherwise be susceptible to vibration and impact damage. In U.S. Pat. No. 3,988,113, Oct. 26/1976, an apparatus for treating engine exhaust gases is described, where a replaceable cartridge is placed in the exhaust tube of an engine. The cartridge is constructed by using woven asbestos fibers, mating the inside of annular walls, with additional asbestos strands extending radially inward to allow exhaust gases through the filter with thorough contact of the polluted fumes and the treated strands. These asbestos mats and strands are chemically treated with ammonia water, ammonium carbonate, urea, hexamethylene, hydrazine, ethylene diamine or any other chemical or catalytic solution which is found to be effective for removing or converting pollutants in the engine exhaust stream to gases or other chemical compounds which are non-toxic or non-poisonous. It is therefore clear that in the two patents just mentioned, the presence of asbestos or other fibers is to afford either support, or better contact with other agents, which are the active core catalysts, or the detoxifying chemicals mentioned.

Other similar devices, collectively known as "catalytic" purifiers or scrubber units, have been proposed. For example, in U.S. Pat. No. Re: 29,932/Mar. 13, 1979, the invention relates to a purifier unit comprising a porous body coated with a substance having catalytic property towards the hot exhaust gases from internal combustion engines. In this case, the porous body is comprised of a plurality of thin corrugated layers of asbestos paper coated with the catalytic agent (Platinum), and eventually heated up to 900° C. to 1200° C. It is indicated that the use of asbestos in the preparation of the porous body is only to: (a) render the unit insensitive to the high temperatures of the exhaust gases; (b) to render the porous body resistant to mechanical stress and shocks arising from jolts and vibrations of a motor vehicle in motion; (c) to act as a solid substrate onto which the active catalysts are coated. Furthermore, it must be realized that heating the asbestos-containing porous body to 900° C.–1200° C. will result in the transformation of asbestos into a different compound: forsterite. All of the above remarks thus indicate that asbestos is not the active catalytic agent, but is used exclusively as a support for the catalyst. A somewhat similar device has also been proposed in U.S. Pat. No. 4,353,872/Oct. 12, 1982, in which heat-resistant expandable sheets made with quartz, vermiculite or asbestos and shaped in the form of a honeycomb, serve as a solid support or carrier, for the catalytic material deposited thereon.

Similarly, U.S. Pat. No. Re. 31,719/Oct. 30, 1984 describes a Platinum group metal used as a catalyst, which is supported on a molded body including alumina cement, having a CaO component, an $Al_2O_3$ component and an iron oxide component. The patent mentions that other carrier materials including magnesium silicates, alumino silicates and even porous metal have also been proposed. Again, the various silicates are used as a carrier. In U.S. Pat. No. 3,899,300/Aug. 12, 1975, a reactor for exhaust gases is described wherein the use of asbestos, with elastomeric binders such as high molecular weight of copolymers of butadiene are used. In this case, the asbestos is used solely for thermally insulating the reactor. In U.S. Pat. No. 3,065,595/Nov. 1962, a catalytic convertor system is described, wherein the active catalysts proposed (oxides of multivalent metals such as iron, chromium, copper, cobalt, manganese molybdenum, nickel, platinum and palladium) are also "impregnated" on carrier particles, composed of glassy or silicious materials, which may be surfaced with a thin layer of clay-like materials. Again in this case, the silicious materials act only as carriers for the active metal catalysts.

In U.S. Pat. No. 4,213,882/July 22, 1980 a method is described for the preparation of pelletized mixtures of natural diatomite, bentonite clay and corn meal, to provide support and considerable surface area for the active catalytic materials (metals or acids) which are deposited on the supporting pellets. Here again, the pelletized material is proposed only as a support.

An object of the present invention is to provide a technique whereby the pelletized asbestos, or other appropriate silicate material, is by itself the active adsorbing or trapping agent, affording a very efficient scrubbing material at a fraction of the cost of metal-catalyst scrubbers currently available.

SUMMARY OF THE INVENTION

In accordance with the present invention there is provided a novel scrubbing material for adsorbing particulate and gaseous pollutants. Essentially the scrubbing material is a noble metal catalyst free material which comprises a filtering mass made up of dry porous pellets consisting of a mixture of natural magnesium silicate selected from chrysotile asbestos, attapulgite and mixtures thereof, with a cementitious clay binder, the latter representing 1 to 20% by weight of the dry pellets.

Also in accordance with the present invention, there is provided a novel method for scrubbing industrial particulate and gaseous pollutants obtained from industrial combustion engines by causing said pollutants to be adsorbed on an adsorbing mass made up of dry porous pellets consisting of a mixture of natural magnesium silicate attapulgite and mixtures thereof with a cementitious clay binder, the latter representing 1 to 20% by weight of the dry pellets.

DETAILED DESCRIPTION OF THE INVENTION

A scrubbing material, composed of asbestos fibers or any other appropriate silicate material whose chemical make-up is such that it is characterized by high adsorption potential for polyaromatic hydrocarbons, is mixed with a small amount of clay and water, fashioned into small pellets by readily available technology, and dried at relatively low temperatures to afford the production of small solid pellets. This pelletized adsorbing material is used as the active scrubbing filler material in the core of an appropriately shaped container, which is affixed on the tail end of the exhaust systems of equipment and/or industrial processes known to generate fumes containing soot particles and noxious chemicals, such as polyaromatic hydrocarbons, nitrous oxides, sulfur oxides, etc.

The preferred adsorbing silicates are chrysotile asbestos (magnesium silicate) and attapulgite (aluminium and magnesium silicate). When mixed with a clay material such as bentonite or other similar cementitious material, and water, it is possible to shape the wet mixtures into small pellets, whose dimensions are such that they may be retained within a cartridge made up of a wire mesh. The cartridge filled with the pellets is contained inside an appropriately shaped metal container. This apparatus is affixed in such a way as to allow normal flow of the exhaust gases, and to afford the desired effect: trapping of soot particles, and adsorption of the noxious chemicals present in the exhaust gases.

Thus, the present invention provides for a system composed of a metal trap, containing a pelletized scrubbing material, for the purpose of adsorbing noxious substances, in particular polycyclic hydrocarbons, present in exhaust fumes of equipments where incomplete pyrolysis of organic materials occurs, such as internal combustion engines and industrial processes generating fumes containing such noxious chemicals. The system also provides for trapping of soot particles present in exhaust fumes.

Pelletizing not only allows for handling the material in a more convenient and less dusty manner, but more importantly, is necessary to provide for a much larger quantity of active adsorbing material to be contained in a smaller volume than would otherwise be possible if the container was filled with the loose adsorbing material.

Furthermore, filling the scrubbing container with pelletized material allows for much less restriction of the flow of air than would be possible with pressure-packing the loose material into the container.

The present invention will be more fully understood by referring to the following Examples.

EXAMPLE 1

To a dry mixture of 48 kilograms of Québec Grade No. 7 of chrysotile asbestos and 2 kilograms of bentonite, sufficient water is added to wet the mixture and allow the formation of pellets, using an inclined rotating disk pelletizer. Alternatively, the pellets can be fashioned by extrusion of a wet cake. Preferably, the pellets should have a diameter of ⅛ inch, so that they may be retained inside a metal wire mesh removable cartridge of the scrubbing apparatus. After formation, the pellets are dried so that they become hard and dust-free. This is achieved by drying the pellets at 80° C. for at least 8 hours. As an alternative to chrysotile asbestos in the dry mixture, other silicate materials, such as attapulgite, which have the chemical make-up adsorb polycyclic hydrocarbons can be used.

EXAMPLE 2

The exhaust pipe of a 4-cylinder gasoline internal combustion engine was connected to the inlet of a filtering unit filled with the scrubbing pellets of Example 1. The gases from the outlet of the filtering unit were analyzed by standard chemical analytical techniques such as high pressure liquid chromatography, fluorometric and U.V. detection. Comparative results, when operating with and without scrubbing pellets, are shown in Table I where it is seen that over 99% of the PAHs are adsorbed after consuming 1 liter of gasoline.

TABLE I

| Test | Anthracene ppm | Fluoranthene ppm | Benzo(a)Pyrene ppm | Benzo(g,h,i)Perylene ppm | TOTAL PAHs ppm |
|---|---|---|---|---|---|
| | | | Without scrubbing pellets | | |
| 1 | 41 | 76 | 7 | 198 | 528 |
| 2 | 57 | 85 | 7 | 61 | 340 |
| 3 | 41 | 57 | 5 | 36 | 226 |
| 4 | 40 | 65 | 6 | 44 | 259 |
| MEAN | 45 | 71 | 6 | 85 | 338 |
| | | With scrubbing pellets containing chrysotile asbestos | | | |
| 1 | 0,10 | 0,15 | 0,018 | 0,18 | 1,25 |
| 2 | 0,22 | 0,25 | 0,022 | 0,24 | 1,82 |
| 3 | 0,05 | 0,18 | 0,013 | 0,14 | 0,97 |
| 4 | 0,44 | 0,22 | 0,014 | 0,08 | 1,22 |
| MEAN | 0,20 | 0,20 | 0,017 | 0,16 | 1,32 |
| Percentage of adsorbed PAHs | 99,6 | 99,7 | 99,7 | 99,8 | 99,6 |

EXAMPLE 3

Another example of application for such a scrubbing material is the scrubbing of fumes resulting from industrial processes, such as vulcanization of rubber. For instance, during a test at a commercial tire retread shop, where the air may contain up to 4 µg of benzo-α-pyrene/M$^3$, the total air collected by the exhaust system of the shop was driven through a 1 M$^3$ bed of the pelletized material: the air flow was 15,000 CFM, 8 hrs/day for 30 days. Air samples were taken before and after treatment through the scrubbing material, and analyzed for benzo-α-pyrene contents. Analyzes show that air treatment by the scrubbing pelletized material results in bringing the benzo-α-pyrene concentration in the air from 4.1 µg/M$^3$ down to 0.8 µg/M$^3$, which is below the permissible level. Thus, the treated air could be returned inside the shop. This could represent a substantial saving in energy cost in situations where the exhausted air has to be replaced by a corresponding volume of air which must be heated.

EXAMPLE 4

The pelletized material is, in addition to its remarkable efficiency to adsorb various polyaromatic hydrocarbons, particularly efficient for trapping soot particles. In the experiment reported in Example 1, a filter paper was affixed at the end of the exhaust pipe, for a period of 5 min. With the engine running without the scrubbing pellets, soot particles were clearly seen, as was observed by simple examination of the filter paper, whereas the filter paper remained essentially free of soot particles when the scrubber container was filled with the asbestos containing pelletized material. This remarkable efficiency for trapping soot particles is in contrast with the relative inability of catalytic trap oxidizers to retain soot particles.

What is claimed is:

1. A method for scrubbing an industrial exhaust material which comprises causing said exhaust materials to flow through a bed of dry porous pellets consisting of a mixture of natural magnesium silicate selected from short chrysotile asbestos fibers, attapulgite and mixtures thereof with a cementitious clay binder, the latter representing from 1 to 20% by weight of the dry pellets, whereby substantially all the particulate and gaseous pollutants present in the exhaust material are adsorbed by the dry porous pellets.

2. A noble metal catalyst free exhaust scrubbing material for adsorbing particulate and gaseous pollutants comprising a filtering mass made up of dry porous pellets consisting of a mixture of natural magnesium silicate selected from short fibers of chrysotile asbestos, attapulgite and mixtures thereof with a cementitious clay binder, the latter representing from 1 to about 20% by weight of the dry pellets.

* * * * *